US009487947B2

(12) United States Patent
Matsukawa et al.

(10) Patent No.: US 9,487,947 B2
(45) Date of Patent: Nov. 8, 2016

(54) DECORATIVE LAMINATED PLATE

(75) Inventors: Yumi Matsukawa, Ibaraki (JP);
Sei-ichi Onoue, Ibaraki (JP)

(73) Assignee: F CONSULTANT CO., LTD.,
Ibaraki-Shi (JP)

( * ) Notice: Subject to any disclaimer, the term of this patent is extended or adjusted under 35 U.S.C. 154(b) by 59 days.

(21) Appl. No.: 14/113,203

(22) PCT Filed: Apr. 18, 2012

(86) PCT No.: PCT/JP2012/060428
§ 371 (c)(1),
(2), (4) Date: Oct. 21, 2013

(87) PCT Pub. No.: WO2012/144513
PCT Pub. Date: Oct. 26, 2012

(65) Prior Publication Data
US 2014/0045396 A1    Feb. 13, 2014

(30) Foreign Application Priority Data

Apr. 19, 2011  (JP) ................................. 2011-093087
Apr. 19, 2011  (JP) ................................. 2011-093088
Feb. 22, 2012  (JP) ................................. 2012-035733
Feb. 22, 2012  (JP) ................................. 2012-035734

(51) Int. Cl.
*E04B 1/94*   (2006.01)
*E04F 13/15*  (2006.01)
*B32B 17/06*  (2006.01)
*B44C 5/04*   (2006.01)
*B32B 5/02*   (2006.01)
*E04F 13/14*  (2006.01)

(52) U.S. Cl.
CPC ................. *E04B 1/94* (2013.01); *B32B 5/022* (2013.01); *B32B 5/024* (2013.01); *B32B 5/028* (2013.01); *B32B 17/064* (2013.01); *B44C 5/04* (2013.01); *B44C 5/0407* (2013.01); *E04F 13/145* (2013.01); *E04F 13/15* (2013.01); *B32B 2260/046* (2013.01); *E04F 2290/045* (2013.01); *Y10T 442/10* (2015.04); *Y10T 442/30* (2015.04); *Y10T 442/60* (2015.04)

(58) Field of Classification Search
CPC ......... B32B 5/02; B32B 5/028; B32B 5/024; B32B 5/022; B32B 17/064; B44C 5/04; C03C 17/34; E04F 13/15; E04B 1/94
USPC ............... 428/904.4, 907.7, 913.3, 920, 921, 428/542.6; 442/1, 27, 45, 136, 139, 140, 442/141, 142, 143, 144, 145, 146, 147, 149, 442/181, 286, 287, 288, 289, 290, 291, 292, 442/293, 294, 301, 327, 394, 395, 396, 397, 442/399, 415, 417
See application file for complete search history.

(56) References Cited

U.S. PATENT DOCUMENTS

| | | | | |
|---|---|---|---|---|
| 3,107,173 A | * | 10/1963 | Klenke, Jr. ............ | B82Y 30/00 106/417 |
| 3,434,862 A | * | 3/1969 | Luc .............................. | 427/152 |
| 4,824,722 A | * | 4/1989 | Jarrett ............... | B32B 17/10018 428/430 |
| 5,178,933 A | * | 1/1993 | Yoshida ............ | B32B 17/10036 156/109 |
| 5,433,997 A | * | 7/1995 | Land ...................... | D06N 3/042 428/904.4 |
| 2013/0210303 A1 | * | 8/2013 | Doi ........................ | B32B 17/02 442/67 |

FOREIGN PATENT DOCUMENTS

| | | |
|---|---|---|
| CN | 2470105 Y | 1/2002 |
| CN | 101423723 A | 5/2009 |
| DE | 29809607 U1 | 11/1998 |
| EP | 0722027 A1 | 7/1996 |
| EP | 0238301 A1 | 9/1996 |
| JP | S53-105522 A | 9/1978 |
| JP | S54-161364 U | 11/1979 |
| JP | S62-129039 U | 8/1987 |
| JP | H03-016942 A | 1/1991 |
| JP | 06-305786 A | 11/1994 |
| JP | 06-322934 A | 11/1994 |
| JP | 3115522 U | 9/2005 |
| JP | 31115522 U | 9/2005 |
| KR | 10-1999-0046117 | 6/1999 |

OTHER PUBLICATIONS

Office Action issued Feb. 18, 2014 in corresponding JP Application No. 2013-511016.
Office Action issued Sep. 10, 2013 in corresponding Japanese Patent Application No. 2013-511016.
Office Action dated Jul. 30, 2014 in corresponding KR Application No. 10-2013-7025747.
Office Action dated Jul. 3, 2014 in corresponding CN Application No. 2012800180535.5.
Extended European Search Report in Application No. 12774637.8, dated Sep. 19, 2014.

\* cited by examiner

*Primary Examiner* — Arti Singh-Pandey
(74) *Attorney, Agent, or Firm* — Knobbe Martens Olson & Bear LLP

(57) ABSTRACT

This invention provides a laminate in which distortion has been suppressed, said laminate exhibiting excellent adhesion characteristics and having a design imparting a sense of luxury; and a laminate which, while imparting a sense of luxury, has excellent fire resistance. This laminate uses a thermosetting resin as the bonding material for a decorative layer which is in contact with a transparent glass plate, and has a fibrous layer and/or a flame-retardant layer laminated on the back side of the decorative layer.

14 Claims, No Drawings

DECORATIVE LAMINATED PLATE

CROSS-REFERENCE TO RELATED APPLICATIONS

This application is the U.S. National Phase under 35. U.S.C. §371 of International Application PCT/JP2012/060428, filed Apr. 18, 2012, which claims priority to Japanese Patent Application No. 2011-093087, filed Apr. 19, 2011, Japanese Patent Application No. 2011-093088, filed Apr. 19, 2011, Japanese Patent Application No. 2012-035733, filed Feb. 22, 2012, and Japanese Patent Application No. 2012-035734, filed Feb. 22, 2012. The disclosures of the above-described applications are hereby incorporated by reference in their entirety. The International Application was published under PCT Article 21(2) in a language other than English.

TECHNICAL FIELD

The present invention relates to a novel laminate rich in a sense of luxury.

BACKGROUND ART

An attempt to give a sense of luxury is made in an architectural material for a wall, a floor, a ceiling, or the like. As such architectural materials, there are, for example, a material having luster using marble or granite stone, a material having a sense of luminance and colorfulness using a glittering pigment or the like, and others.

Also, in Patent Document 1, a decorative plate is disclosed in which a resin layer containing a pigment is formed and integrated between a metal plate and a glass layer. This decorative plate imparts a design having a color and a texture that are unprecedented by a synergistic effect of the glass layer and the resin layer.

PRIOR ART DOCUMENT

Patent Document

Patent Document 1: JP-A-06-322934

SUMMARY OF THE INVENTION

Problems to be Solved by the Invention

However, by the technique of Patent Document 1, there are cases where adhesion between the glass layer and the resin layer may be inferior. Further, there are cases where the metal plate or the glass layer may be distorted when the resin is cured, thereby raising a fear that the design property may be deteriorated.

Also, when the resin layer is used, there are cases where the fire-proof property may not be ensured. For example, when the surface is a glass layer as in the technique of Patent Document 1, there are cases where the fire-proof property may not be ensured because the resin layer may burn when cracks are generated in the glass layer at the time of fire. In particular, when the ratio of the resin layer is increased in order to obtain an excellent design property, it is difficult to ensure the fire-proof property. In order to solve such a problem, blending a flame-retardant in the resin layer may be considered; however, in this case, there is a fear that the design property may be adversely affected.

Means for Solving the Problems

The present invention has been made in view of these circumstances, and an object thereof is to obtain a laminate having a design excellent in adhesion and rich in a sense of luxury in which distortion is suppressed. Another object of the present invention is to obtain a laminate being excellent in fire-proof property while having a design rich in a sense of luxury.

The present inventors have made eager studies in order to solve these problems and have found out that a laminate achieving the aforementioned object can be obtained by using a bonding material containing a thermosetting resin as a bonding material of a decorative layer that is in contact with a transparent glass plate and laminating a fibrous layer and/or a flame-retardant layer on the back side of the decorative layer, thereby completing the present invention.

That is, the present invention has the following characteristics.

1. A laminate in which a decorative layer is laminated on the back side of a transparent glass plate, wherein
the decorative layer is a decorative layer containing a bonding material and a coloring material and is made of one layer or two or more layers;
the bonding material of the decorative layer that is in contact with the transparent glass plate contains at least a thermosetting resin; and
further a fibrous layer and/or a flame-retardant layer is laminated on the back side of the decorative layer.
2. The fibrous layer is at least one kind selected from a woven cloth, a non-woven cloth, and a mesh.
3. A flame-retardant contained in the flame-retardant layer is at least one kind selected from a phosphorus compound, a halide, an antimony compound, a boric acid compound, and a hydrated metal compound.

Effects of the Invention

The laminate of the present invention provides a design rich in a sense of luxury. The laminate of the present invention is excellent in adhesion between the transparent glass plate and the decorative layer and can prevent distortion of the transparent glass plate. Further, the laminate of the present invention can suppress cracking of glass by impact, fire or the like, and can also prevent scattering of glass fragments.

MODE FOR CARRYING OUT THE INVENTION

Hereafter, embodiments of the present invention will be described.

The present invention is a laminate in which a decorative layer containing a bonding material and a coloring material is laminated on the back side of a transparent glass plate, wherein the decorative layer is made of one layer or two or more layers; the bonding material of the decorative layer that is in contact with the transparent glass plate contains at least a thermosetting resin; and further a fibrous layer and/or a flame-retardant layer is laminated on the back side of the decorative layer.

In this manner, the laminate of the present invention has a transparent glass plate on the outermost surface, and a design is made by the decorative layer on the back surface thereof, whereby a design rich in a sense of luxury can be given by the mirror surface effect of the transparent glass plate, the refraction effect, and the design of the decorative layer. Further, since a flame retardant layer is laminated on the back side of the decorative layer, an excellent fire-proof property can be exhibited without deteriorating the design property.

The transparent glass plate is not particularly limited as long as it has transparency of such a degree that the design of the decorative layer is not deteriorated. Typically, a glass plate having high transparency may be used; however, a translucent glass plate, a glass plate having a pattern formed thereon, a glass plate obtained by bonding two or more different kinds of glass plates together, a glass plate whose surface is coated, or the like may be used in accordance with the usage.

For example, ordinary glass, float glass, ground glass, frost glass, high-transmittance glass, template glass, heat-resistant glass, colored transparent glass, reinforced glass, heat-reflecting glass, or the like may be used.

The thickness of the transparent glass plate may be about 1 mm or more and 30 mm or less (preferably about 2 mm or more and 10 mm or less, more preferably about 3 mm or more and 8 mm or less).

The optical transmittance of the transparent glass plate is preferably about 40% or more (further, 60% to 99%). When the optical transmittance is within such a range, an excellent design can be obtained without losing a sense of luminance and a color tone. Also, a laminate rich in a sense of luxury and having a sense of depth and a sense of richness can be obtained. Here, the optical transmittance is a value of the total light transmittance as measured by using an integral sphere-type light transmittance measurement apparatus in accordance with the measurement method A defined in JIS K 7105-1981 5.5 "Light Transmittance and Total Light Reflectance". Here, as the optical transmittance, a value obtained by measurement at a wavelength of 550 nm is used.

The decorative layer is a decorative layer containing a bonding material and a coloring material and is made of one layer or two or more layers, and the bonding material of the decorative layer that is in contact with the transparent glass plate contains at least a thermosetting resin.

The bonding material may be, for example, a thermoplastic resin or a thermosetting resin. In the present invention, because the bonding material of the decorative layer that is in contact with the transparent glass plate contains at least a thermosetting resin, a cross-linked structure (for example, a three-dimensional cross-linked structure by curing such as reaction of a reactive functional group, or the like) is formed, whereby the adhesion to the transparent glass plate will be excellent and the coloring material can be firmly fixed to form an excellent design. Here, the thermosetting resin of the present invention refers to a resin that forms a three-dimensional cross-linked structure by curing. The thermosetting resin may be, for example, one that forms a three-dimensional cross-linked structure by reaction of a reactive functional group, or the like.

The aforementioned reactive functional group may be, for example, a carboxyl group, a carbodiimide group, an epoxy group, an aziridine group, an oxazoline group, a hydroxyl group, an isocyanate group, a carbonyl group, a hydrazide group, an amino group, or an alkoxysilyl group. Combination of such reactive functional groups may be, for example, a combination of a carboxyl group and a carbodiimide group, a carboxyl group and an epoxy group, a carboxyl group and an aziridine group, a carboxyl group and an oxazoline group, a hydroxyl group and an isocyanate group, a carbonyl group and a hydrazide group, an epoxy group and an amino group, or alkoxysilyl groups.

The thermosetting resin in the present invention has one kind or two or more kinds of combinations of such reactive functional groups. In the present invention, the thermosetting resin preferably has two or more kinds, further preferably three or more kinds, of combinations of reactive functional groups. A particularly preferable combination of reactive functional groups may be, for example, one or more kinds selected from a carboxyl group and an epoxy group, a hydroxyl group and an isocyanate group, an epoxy group and an amino group, and alkoxysilyl groups.

The thermosetting resin preferably has at least an alkoxysilyl group. In a preferable embodiment, the thermosetting resin has an alkoxysilyl group and further has one or more kinds (preferably two or more kinds) of the aforementioned combinations of reactive functional groups (excluding the combination of alkoxysilyl groups). By using such a thermosetting resin, the adhesion to the transparent glass plate will be excellent and the coloring material can be firmly fixed, whereby an excellent design can be easily formed.

As the thermosetting resin in the present invention, it is possible to use a thermosetting resin made of one component or two or more components having the aforementioned reactive functional groups. For example, a thermosetting resin made of one kind or two or more kinds of resins, a thermosetting resin made of one or more kinds of resins and one or more kinds of curing agents, or the like can be used.

For example, the aforementioned resin may be epoxy resin, urethane resin, silicon resin, acrylic silicon resin, alkyd resin, melamine resin, polycarbonate resin, phenolic resin, acrylic resin, polyester resin, polyether resin, vinyl resin, polyamide resin, fluororesin, vinyl acetate resin, vinyl chloride resin, acrylic-styrene resin, vinyl acetate-vinyl versatate resin, polyvinylpyrrolidone resin, polyvinylcaprolactam resin, polyvinyl alcohol resin, ABS resin, AS resin, cellulose resin, or amino resin. The type of the resin is not particularly limited, and the type may be, for example, a water-dispersed type, a water-soluble type, a weak solvent type, a strong solvent type, an NAD type, or a powder type.

In the present invention, particularly one or more kinds selected from epoxy resin, urethane resin, silicon resin, and acrylic silicon resin are suitably used.

Further, in the present invention, an acrylic silicon resin is preferably contained. Also, it is preferable to use a silicon compound having a functional group capable of reacting with the aforementioned resin as a curing agent in view of providing, for example, excellent adhesion to the transparent glass plate.

Besides the aforementioned thermosetting resin, it is possible to use a thermoplastic resin as the bonding material used in the present invention. In the present invention, the bonding material of the decorative layer that is in contact with the transparent glass plate is not particularly limited as long as the bonding material contains at least a thermosetting resin, so that a thermoplastic resin and/or a thermosetting resin may be used for the other layers.

Here, unlike the aforementioned thermosetting resin, the thermoplastic resin in the present invention is a resin that does not form a three-dimensional cross-linked structure by curing, and may be, for example, epoxy resin, urethane resin, silicon resin, acrylic silicon resin, alkyd resin, melamine resin, polycarbonate resin, phenolic resin, acrylic resin, polyester resin, polyether resin, vinyl resin, polyamide resin, fluororesin, vinyl acetate resin, vinyl chloride resin, acrylic-styrene resin, vinyl acetate-vinyl versatate resin, polyvinylpyrrolidone resin, polyvinylcaprolactam resin, polyvinyl alcohol resin, ABS resin, AS resin, cellulose resin, or amino resin. The type of the resin is not particularly limited, and the type may be, for example, a water-dispersed type, a water-soluble type, a weak solvent type, a strong solvent type, an NAD type, or a powder type.

In the present invention, the bonding material of the decorative layer that is in contact with the transparent glass plate is suitably a material in which 70 wt % or more, more preferably 85 wt % or more, still more preferably 100 wt %, of the thermosetting resin is contained relative to the whole amount of the bonding material. Here, the bonding material of the decorative layer that is not in contact with the transparent glass plate is not particularly limited, and the bonding material may be a thermosetting resin, a thermoplastic resin, or the like.

The coloring material is not particularly limited as long as the coloring material imparts a design property, so that one kind or two or more kinds of known ones can be used.

In the present invention, the size of the coloring material may be 0.1 μm or more and 10 mm or less. In particular, by using two or more kinds of coloring materials having different sizes, a laminate being more excellent in a design property can be obtained.

Also, the shape of the coloring material of the present invention is not particularly limited, and the shape may be spherical, scale-like, needle-like, or the like; however, in the present invention, a coloring material having a scale-like shape is preferably contained. By the coloring material having a scale-like shape, the brightness, the hue, and the sense of luminance change depending on the viewing angle, so that the sense of luxury can be enhanced to a greater extent, and also it is advantageous in view of facilitating the management of the film thickness of the decorative layer.

In the case of the scale-like coloring material, the size is preferably 0.1 μm or more and 10 mm or less, and the thickness is preferably 0.01 μm or more and 50 μm or less. Here, the size of the scale-like shape refers to the maximum diameter when the coloring material having a scale-like shape is stably placed to stand still on a horizontal surface and observed from above. Also, the thickness of the coloring material having a scale-like shape refers to the maximum height from the bottom surface when the coloring material having a scale-like shape is stably placed to stand still on a horizontal surface.

Examples of such coloring materials include inorganic coloring pigments such as titanium oxide, zinc oxide, alumina, carbon black, ferric oxide (red iron oxide), yellow iron oxide, iron oxide, ultramarine blue, and cobalt green, organic coloring pigments such as azo-based, naphthol-based, pyrazolone-based, anthraquinone-based, perylene-based, quinacridone-based, disazo-based, isoindolinone-based, benzimidazole-based, phthalocyanine-based, and quinophthalone-based pigments, glittering pigments, fluorescent pigments, phosphorescent and fluorescent pigments, and various particles such as calcium carbonate, barium sulfate, clay, kaolin, China clay, talc, silica rock sand, diatomaceous earth, isinglass, mica, silica particles, glass particles, resin particles, and metal particles. Also, the coloring material may be one in which the surface of these particles is colored with a pigment, a dye, or the like.

Particularly in the present invention, it is preferable that two or more kinds of coloring materials having different sizes are contained. In particular, it is preferable that a coloring material having a size of less than 0.5 mm (preferably 0.1 μm or more and less than 0.5 mm, still more preferably 0.5 μm or more and less than 0.3 mm) and a coloring material having a size of 0.5 mm or more (preferably 0.5 mm or more and 10 mm or less, still more preferably 0.7 mm or more and 5 mm or less) are contained. The coloring material having a size of less than 0.5 mm has a size of such a degree that the shape thereof can hardly be confirmed by eye inspection though the hue can be confirmed. On the other hand, the coloring material having a size of 0.5 mm or more has a size of such a degree that the shape thereof can be confirmed even by eye inspection. By using such coloring materials having different sizes in combination, a sense of depth and a sense of richness can be imparted to the decorative layer, whereby a design having a better sense of luxury can be given. In particular, when the coloring material having a size of less than 0.5 mm is disposed closer to the surface side than the coloring material having a size of 0.5 mm or more, a design having a sense of depth, a sense of richness, and a sense of luxury can be given more. Also, when the hue of the decorative layer is a dark color, the reflected light can be visibly recognized easily, and the mirror surface effect can be expected to a greater extent.

Also, it is preferable that either one of or both of the coloring material having a size of less than 0.5 mm and the coloring material having a size of 0.5 mm or more contain a coloring material having a scale-like shape. When the coloring material having a size of less than 0.5 mm has a scale-like shape, the thickness thereof is preferably 0.01 μm or more and 50 μm or less. When the coloring material having a size of 0.5 mm or more has a scale-like shape, the thickness thereof is preferably 10 μm or more and 1 mm or less.

Examples of the coloring materials having a scale-like shape include glittering pigments such as aluminum flake pigment, vapor-deposited aluminum flake pigment, aluminum flake pigment coated with metal oxide, colored aluminum flake pigment, mica pigment coated with metal oxide, synthesized mica pigment coated with metal oxide, alumina flake pigment coated with metal oxide, silica flake pigment coated with metal oxide, glass flake pigment coated with metal, glass flake pigment coated with metal oxide, plate-shaped iron oxide coated with metal oxide, graphite, stainless steel flake pigment, titanium flake pigment, titanium dioxide flake pigment, magnesium oxide flake pigment, aluminum oxide flake pigment, silicon flake pigment, calcium oxide flake pigment, iron oxide flake pigment, cobalt oxide flake pigment, nickel oxide flake pigment, zirconium oxide flake pigment, tin oxide flake pigment, vanadium oxide flake pigment, copper oxide flake pigment, zinc oxide, molybdenum sulfide flake pigment, bismuth chloride flake pigment, hologram pigment, cholesteric liquid crystal polymer, and metal-vapor-deposited polymer film, scale-like particles and the like of white mica, synthesized mica, silica flake, glass flake, resin flake, aluminum flake, and mica flake, and scale-like particles whose surface is colored with a glittering pigment, an inorganic coloring pigment, an organic coloring pigment, a fluorescent pigment, or a phosphorescent and fluorescent pigment. As the scale-like particles, particles whose surface is colored with a glittering pigment are suitably used.

The mixing ratio between the bonding material and the coloring material may be such that about 10 parts by weight or more and 500 parts by weight or less (preferably 20 parts by weight or more and 300 parts by weight or less, still more preferably 30 parts by weight or more and 200 parts by weight or less) of the coloring material is contained relative to 100 parts by weight of the solid component of the bonding material. Here, when a curing agent is contained, calculation is made by regarding it as a bonding material. In this manner, the laminate of the present invention is excellent in the adhesion to the transparent glass plate even if a large amount of the coloring material is contained. The coloring material is preferably contained to such an extent that the back side of the decorative layer cannot be seen through.

The thickness of the decorative layer may be about 0.1 mm or more and 2 mm or less (preferably about 0.3 mm or more and 1.5 mm or less).

The decorative layer of the present invention can contain other additives in addition to the bonding material and the coloring material. Examples of other additives include a fiber, a flame retardant, a plasticizer, a preservative, a mildew proofing agent, a defoaming agent, a viscosity adjusting agent, a leveling agent, a pigment dispersing agent, a sedimentation preventing agent, a drip preventing agent, a delustering agent, an ultraviolet absorber, a light stabilizer, an antioxidant, an antimicrobial agent, an adsorbent, and a photocatalyst. Additives such as a solvent or water may be contained at the time of forming the decorative layer.

In particular, because the flame retardant is contained, combustion by fire or the like can be prevented to enhance the fire-proof property. As the flame retardant, known ones may be used. Examples thereof include a phosphorus compound, a halide, an antimony compound, a boric acid compound, and a hydrated metal compound, and one or more kinds among these are contained.

Examples of the phosphorus compound include phosphorus trichloride, phosphorus pentachloride, ammonium phosphate, ammonium polyphosphate, tricresyl phosphate, diphenyl cresyl phosphate, tris($\beta$-chloroethyl)phosphate, tris ($\beta$-chloropropyl)phosphate, tributoxyethyl phosphate, tributyl phosphate, triethyl phosphate, triphenyl phosphate, tricresyl phosphate, cresyl phenyl phosphate, trixylenyl phosphate, dimethyl methylphosphonate, 2-ethylhexyl diphenyl phosphate, aromatic phosphoric acid ester, and halogen-containing phosphoric acid ester.

Examples of the halogen compound include chlorinated polyphenyl, chlorinated polyethylene, diphenyl chloride, triphenyl chloride, fatty acid ester pentachloride, perchloropentacyclodecane, chlorinated naphthalene, tetrachlorophthalic acid anhydride, tetrabromobisphenol A, decabromodiphenyl ether, hexabromocyclododecane, bis (tetrabromophthalimide)ethane, brominated polystyrene, bis (pentabromophenyl)ethane, poly(dibromopropyl ether), and hexabromobenzene.

Examples of the antimony compound include antimony trioxide, antimony tetraoxide, antimony pentoxide, antimony pentachloride, and sodium antimonate.

Examples of the boric acid compound include zinc borate and sodium borate.

Examples of the hydrated metal compound include aluminum hydroxide hydrate, magnesium hydroxide hydrate, aluminum sulfate hydrate, potassium sulfate hydrate, iron sulfate hydrate, magnesium sulfate hydrate, sodium sulfate hydrate, nickel sulfate hydrate, zinc sulfate hydrate, beryllium sulfate hydrate, zirconium sulfate hydrate, zinc sulfite hydrate, sodium sulfite hydrate, aluminum phosphate hydrate, cobalt phosphate hydrate, magnesium phosphate hydrate, zinc phosphate hydrate, magnesium hydrogenphosphate hydrate, zinc dihydrogenphosphate hydrate, aluminum nitrate hydrate, zinc nitrate hydrate, calcium nitrate hydrate, cobalt nitrate hydrate, bismuth nitrate hydrate, zirconium nitrate hydrate, cerium nitrate hydrate, iron nitrate hydrate, nickel nitrate hydrate, magnesium nitrate hydrate, zinc acetate hydrate, cobalt acetate hydrate, cobalt chloride hydrate, iron chloride hydrate, sodium tetraborate hydrate, disodium octaborate hydrate, and zinc borate hydrate.

Also, the decorative layer may be one layer or may be made of two or more layers. For example, when the decorative layer is made of two or more layers, a sense of depth and a sense of richness can be given more by suitably allowing each layer to contain a coloring material having a different size from one another.

A particularly preferable mode of the decorative layer is such that a first decorative layer containing a bonding material and a first coloring material is laminated on a back side of the transparent glass plate; a second decorative layer containing a bonding material and a second coloring material having a larger size than the first coloring material is laminated on a further back side thereof; and a fibrous layer and/or a flame-retardant layer are laminated on the back side of the decorative layer.

In particular, the first coloring material is preferably a coloring material having a size of less than 0.5 mm (more preferably 0.1 µm or more and less than 0.5 mm, still more preferably 0.5 µm or more and less than 0.3 mm). The second coloring material is preferably a coloring material having a size of 0.5 mm or more (more preferably 0.5 mm or more and 10 mm or less, still more preferably 0.7 mm or more and 5 mm or less).

Also, when the decorative layer is made of two layers, that is, the first decorative layer and the second decorative layer, the first decorative layer is preferably such that 5 parts by weight or more and 400 parts by weight or less of the coloring material is contained relative to 100 parts by weight of the solid component of the bonding material, and the second decorative layer is preferably such that 10 parts by weight or more and 700 parts by weight or less of the coloring material is contained relative to 100 parts by weight of the solid component of the bonding material. Here, when the decorative layer is made of two or more layers, it is preferable that 10 parts by weight or more and 500 parts by weight or less of the coloring material is contained relative to 100 parts by weight of the solid component of the bonding material in the decorative layer as a whole.

The fibrous layer of the present invention is made of a woven cloth, a non-woven cloth, a mesh, or the like.

Examples of the fiber materials of such a fibrous layer include organic fibers such as pulp fiber, polyester fiber, polypropylene fiber, aramid fiber, vinylon fiber, polyethylene fiber, polyarylate fiber, PBO fiber (polyparaphenylenebenzobisoxazole fiber), nylon fiber, acrylic fiber, vinyl chloride fiber, and cellulose fiber, and inorganic fibers such as glass fiber, silica fiber, silica-alumina fiber, carbon fiber, and silicon carbide fiber. In the present invention, the fibrous layer preferably contains an inorganic fiber and still more preferably contains a glass fiber among the inorganic fibers.

Such a fibrous layer is richer in softness than the transparent glass plate and also has air permeability. For this reason, the fibrous layer can alleviate the influence of stress caused by the cohesive force or the like of the bonding material at the time of forming the decorative layer and can prevent distortion of the transparent glass plate.

Further, the fibrous layer can suppress cracks of the glass caused by impact or fire and can prevent scattering of glass fragments. In particular, a fibrous layer containing glass fiber is preferable because of having heat resistance and being light in weight. Also, the fibrous layer is advantageous in being capable of flattening the back surface, facilitating management of the thickness of the laminate, and facilitating the implementation.

When a material having a high hardness such as the metal plate disclosed in Patent Document 1 or a material that does not have air permeability is used instead of the fibrous layer, stress is imposed upon the transparent glass plate by the cohesive force or the like of the thermosetting resin, thereby raising a fear of causing distortion of the transparent glass plate.

When nothing is laminated on the back surface of the decorative layer, it is not possible to suppress cracks of the glass caused by impact, and also it is not possible to prevent scattering of the glass fragments caused by impact or fire. Also, management of the thickness of the laminate is difficult.

The thickness of the fibrous layer may be about 0.1 mm or more and 1.5 mm or less, preferably 0.2 mm or more and 1.0 mm or less.

A method of producing the laminate of the present invention is not particularly limited, and a known method can be adopted. For example, the laminate can be obtained by applying and laminating a material for forming the decorative layer (which may hereafter be referred to as a "decorative layer forming material") on the back surface of a transparent glass plate, laminating a fibrous layer before the decorative layer forming material is dried and cured, and thereafter performing drying and curing. In this case, the decorative layer forming material functions also as a material for bonding the fibrous layer, whereby the production can be simplified.

Meanwhile, when the decorative layer is made of two layers, the laminate can be obtained by applying and laminating a first decorative layer forming material on the back surface of a transparent glass plate, applying and laminating a second decorative layer forming material in a state where the first decorative layer forming material is cured or not cured yet, laminating a fibrous layer before the second decorative layer forming material is dried and cured, and thereafter performing drying and curing.

Even if the decorative layer is made of three or more layers, the laminate can be obtained in the same manner. In this case, the production can be simplified by laminating the fibrous layer before the decorative layer forming material that is brought into contact with the fibrous layer is dried and cured.

A method of applying and laminating these decorative layer forming materials may be, for example, a method of using an application tool such as a roller, a brush, a trowel, a spatula, or a gun, extrusion molding, or a method of using an apparatus such as flow coater or a roll coater.

The laminate can also be obtained by spreading a coloring material onto the back surface of a transparent glass plate, allowing a bonding material to flow thereon, further laminating a fibrous layer, and performing drying and curing. By a method of spreading as described above, the bonding material or the like may be applied and laminated before spreading and/or after spreading the coloring material onto the transparent glass plate. Also, the fibrous layer may be laminated before the bonding material is dried and cured.

Also, the flame-retardant layer of the present invention may be, for example, a layer containing a flame retardant, a layer containing a flame-retardant resin, or the like, and is a layer that prevents combustion by fire or the like and enhances the fire-proof property. Also, an inorganic foamed plate or the like may be used as the flame-retardant layer. Here, as the flame-retardant layer, a metal plate is excluded.

As the layer containing a flame retardant, a flame retardant can be used by fixing the flame retardant using a bonding material or the like.

As the flame retardant, known ones may be used. Examples thereof include a phosphorus compound, a halide, an antimony compound, a boric acid compound, and a hydrated metal compound described above, and one or more kinds among these are contained.

The bonding material is not particularly limited, and a thermosetting resin or a thermoplastic resin described above can be used.

The blending ratio of the flame retardant in the flame-retardant layer is 100 parts by weight or more, preferably 200 parts by weight or more and 1500 parts by weight or less, still more preferably 300 parts by weight or more and 1200 parts by weight or less, relative to 100 parts by weight of the bonding material (solid component).

The thickness of the flame-retardant layer may be about 0.5 mm or more and 3 mm or less.

In the present invention, an excellent fire-proof property can be imparted while maintaining an excellent design by disposing the flame-retardant layer on the back side of the decorative layer.

The flame-retardant layer of the present invention can contain other additives in addition to the flame retardant and the bonding material. Examples of other additives include a coloring material, a fiber, a plasticizer, a preservative, a mildew proofing agent, a defoaming agent, a viscosity adjusting agent, a leveling agent, a pigment dispersing agent, a sedimentation preventing agent, a drip preventing agent, a delustering agent, an ultraviolet absorber, alight stabilizer, an antioxidant, an antimicrobial agent, an adsorbent, and a photocatalyst. Additives such as a solvent or water may be contained at the time of forming the flame-retardant layer.

In the present invention, those containing a coloring material are preferable, and those in which the flame-retardant layer is colored with a coloring material are preferable. As the coloring material, for example, one or more kinds among the aforementioned coloring materials can be used.

The flame-retardant resin may be, for example, a resin such as a phenolic resin, a silicon resin, or a vinyl chloride resin. The flame-retardant layer of the present invention may be a resin sheet or board formed with these flame-retardant resins, a foamed flame-retardant resin sheet or board formed by foaming, or the like.

Also, these flame-retardant resins may contain additives such as a flame retardant described above, an aggregate, a coloring material, a fiber, a plasticizer, a preservative, a mildew proofing agent, a defoaming agent, a viscosity adjusting agent, a leveling agent, a pigment dispersing agent, a sedimentation preventing agent, a drip preventing agent, a delustering agent, an ultraviolet absorber, alight stabilizer, an antioxidant, an antimicrobial agent, an adsorbent, and a photocatalyst.

A method of producing the laminate of the present invention is not particularly limited, and a known method can be adopted. For example, the laminate can be obtained by applying and laminating a material for forming the decorative layer (which may hereafter be referred to as a "decorative layer forming material") on the back surface of a transparent glass plate, applying and laminating a material for forming the flame-retardant layer (which may hereafter be referred to as a "flame-retardant layer forming material") before or after the decorative layer forming material is dried and cured, and thereafter performing drying and curing, or bonding a flame-retardant layer that has been prepared in advance.

Meanwhile, when the decorative layer is made of two layers, the laminate can be obtained by applying and laminating a first decorative layer forming material on the back surface of a transparent glass plate, applying and laminating a second decorative layer forming material in a state where the first decorative layer forming material is cured or not cured yet, applying and laminating a flame-retardant layer forming material before or after the second decorative layer forming material is dried and cured, and thereafter performing drying and curing, or bonding a flame-retardant layer that has been prepared in advance.

Even if the decorative layer is made of three or more layers, the laminate can be obtained in the same manner.

Further, a fibrous layer can be laminated before the flame-retardant layer forming material is dried and cured. In this case, the flame-retardant layer forming material functions also as a material for bonding the fibrous layer, whereby the production can be simplified.

A method of applying and laminating these decorative layer forming materials and flame-retardant layer forming material may be, for example, a method of using an application tool such as a roller, a brush, a trowel, a spatula, or a gun, extrusion molding, or a method of using an apparatus such as a flow coater or a roll coater.

The laminate can also be obtained by spreading a coloring material onto the back surface of a transparent glass plate, allowing a bonding material to flow thereon, further laminating a flame-retardant layer forming material, and performing drying and curing. By a method of spreading as described above, the bonding material or the like may be applied and laminated before spreading and/or after spreading the coloring material onto the transparent glass plate.

Also, the laminate of the present invention preferably has a structure of transparent glass plate/decorative layer/fibrous layer, transparent glass plate/first decorative layer/second decorative layer/fibrous layer, transparent glass plate/decorative layer/flame-retardant layer, or transparent glass plate/first decorative layer/second decorative layer/flame-retardant layer. Further, a structure of transparent glass plate/decorative layer/flame-retardant layer/fibrous layer or transparent glass plate/first decorative layer/second decorative layer/flame-retardant layer/fibrous layer is preferable. Also, besides these, the laminate of the present invention may have a structure of transparent glass plate/first decorative layer/fibrous layer/second decorative layer/fibrous layer, transparent glass plate/first decorative layer/fibrous layer/second decorative layer/flame-retardant layer/fibrous layer, transparent glass plate/first decorative layer/fibrous layer/second decorative layer/third decorative layer/fibrous layer, transparent glass plate/first decorative layer/fibrous layer/second decorative layer/third decorative layer/flame-retardant layer/fibrous layer, or the like.

The thickness of the laminate is not particularly limited; however, the thickness is preferably about 1 mm or more and 12 mm or less (more preferably about 2 mm or more and 10 mm or less).

The laminate of the present invention can also be applied to various usages such as an architectural material for a wall, a floor, a ceiling, or the like, and furniture such as a table or a counter. A laminate as described above can give a design having a sense of luxury by bonding so that the transparent glass plate will be on the front surface side and the fibrous layer and/or the flame-retardant layer side will be the back surface side.

EXAMPLES

Experiment Example Group I

Experiment Examples I-1 to I-15

After a decorative layer forming material was applied at a needed amount of 1.4 kg/m² with a roller onto a transparent glass plate by using materials shown in Table 1 to Table 4 in a formulation shown in Table 5 and a combination shown in Table 6, a fibrous layer was laminated before the decorative layer forming material was cured, followed by drying at a temperature of 50° C. and a relative humidity of 60% for 5 hours to obtain a test body. Here, the thickness of the decorative layer (first) was 0.8 mm.

Experiment Examples I-16 to I-32

After a first decorative layer forming material was applied at a needed amount of 0.7 kg/m² with a roller onto a transparent glass plate by using materials shown in Table 1 to Table 4 in a formulation shown in Table 5 and a combination shown in Table 6, a second decorative layer forming material was applied at a needed amount of 0.7 kg/m² with a roller before the first decorative layer forming material was cured, and further a fibrous layer was laminated before the second decorative layer forming material was cured, followed by drying at a temperature of 50° C. and a relative humidity of 60% for 5 hours to obtain a test body. Here, the thickness of the decorative layer (combined thickness of decorative layer (first) and decorative layer (second)) was 0.8 mm.

Experiment Example I-33

After a first decorative layer forming material was applied at a needed amount of 0.4 kg/m² with a roller onto a transparent glass plate by using materials shown in Table 1 to Table 4 in a formulation shown in Table 5 and a combination shown in Table 6, a fibrous layer was laminated before the first decorative layer forming material was cured.

Subsequently, after a second decorative layer forming material was applied at a needed amount of 0.7 kg/m² with a roller onto the fibrous layer, a third decorative layer forming material was applied at a needed amount of 0.7 kg/m² with a roller before the second decorative layer forming material was cured, and further a fibrous layer was laminated before the third decorative layer forming material was cured, followed by drying at a temperature of 50° C. and a relative humidity of 60% for 5 hours to obtain a test body. Here, the thickness of the decorative layer (first) was 0.2 mm, and the combined thickness of the decorative layer (second) and the decorative layer (third) was 0.8 mm.

Experiment Example I-34

After a first decorative layer forming material was applied at a needed amount of 0.4 kg/m² with a roller onto a transparent glass plate by using materials shown in Table 1 to Table 4 in a formulation shown in Table 5 and a combination shown in Table 6, a fibrous layer was laminated before the first decorative layer forming material was cured.

Subsequently, after a second decorative layer forming material was applied at a needed amount of 1.4 kg/m² with a roller onto the fibrous layer, further a fibrous layer was laminated before the second decorative layer forming material was cured, followed by drying at a temperature of 50° C. and a relative humidity of 60% for 5 hours to obtain a test body. Here, the thickness of the decorative layer (first) was 0.2 mm, and the thickness of the decorative layer (second) was 0.8 mm.

Experiment Example Group II

A decorative layer forming material was prepared by using materials shown in Table 1 to Table 3 in a formulation shown in Table 5.

A flame-retardant layer forming material was prepared by using materials shown in Table 1 to Table 3 in a formulation shown in Table 7.

Also, transparent glass, a fibrous layer, and a metal plate shown in Table 4 were used.

Experiment Examples II-1 to II-18

After a decorative layer forming material was applied at a needed amount of 1.3 kg/m² with a roller onto a transparent glass plate with a combination shown in Table 8, the resultant was dried at a temperature of 50° C. and a relative humidity of 60% for 5 hours. Subsequently, after a flame-retardant layer forming material was applied at a needed amount of 1.3 kg/m² with a roller onto the decorative layer, the resultant was dried at a temperature of 50° C. and a relative humidity of 60% for 5 hours to obtain a test body. Here, the thickness of the decorative layer (first) was 0.8 mm. The thickness of the flame-retardant layer was 1.0 mm.

The following evaluation was carried out on the obtained test body.

Experiment Examples II-19 to II-35

After a first decorative layer forming material was applied at a needed amount of 0.3 kg/m² with a roller onto a transparent glass plate with a combination shown in Table 8, the resultant was dried at a temperature of 50° C. and a relative humidity of 60% for 5 hours. Subsequently, after a second decorative layer forming material was applied at a needed amount of 1.0 kg/m² with a roller onto the first decorative layer, the resultant was dried at a temperature of 50° C. and a relative humidity of 60% for 5 hours. Subsequently, after a flame-retardant layer forming material was applied at a needed amount of 1.3 kg/m² with a roller, the resultant was dried at a temperature of 50° C. and a relative humidity of 60% for 5 hours to obtain a test body. Here, the thickness of each decorative layer (combined thickness of decorative layer (first) and decorative layer (second)) was 0.8 mm. The thickness of the flame-retardant layer was 1.0 mm.

An evaluation was carried out on the obtained test body by a test similar to that of Experiment Example II-1.

Experiment Examples II-36 and II-37

After a decorative layer forming material was applied at a needed amount of 1.3 kg/m² with a roller onto a transparent glass plate with a combination shown in Table 8, the resultant was dried at a temperature of 50° C. and a relative humidity of 60% for 5 hours. Subsequently, after a flame-retardant layer forming material was applied at a needed amount of 1.3 kg/m² with a roller onto the decorative layer, a fibrous layer was laminated before the flame-retardant layer forming material was cured, followed by drying at a temperature of 50° C. and a relative humidity of 60% for 5 hours to obtain a test body. Here, the thickness of the decorative layer (first) was 0.8 mm. The thickness of the flame-retardant layer was 1.0 mm.

An evaluation was carried out on the obtained test body by a test similar to that of Experiment Example II-1.

Experiment Examples II-38 to II-40

After a first decorative layer forming material was applied at a needed amount of 0.3 kg/m² with a roller onto a transparent glass plate with a combination shown in Table 8, the resultant was dried at a temperature of 50° C. and a relative humidity of 60% for 5 hours. Subsequently, after a second decorative layer forming material was applied at a needed amount of 1.0 kg/m² with a roller onto the first decorative layer, the resultant was dried at a temperature of 50° C. and a relative humidity of 60% for 5 hours. Subsequently, after a flame-retardant layer forming material was applied at a needed amount of 1.3 kg/m² with a roller, a fibrous layer was laminated before the flame-retardant layer forming material was cured, followed by drying at a temperature of 50° C. and a relative humidity of 60% for 5 hours to obtain a test body. Here, the thickness of each decorative layer (combined thickness of decorative layer (first) and decorative layer (second)) was 0.8 mm. The thickness of the flame-retardant layer was 1.0 mm.

An evaluation was carried out on the obtained test body by a test similar to that of Experiment Example II-1.

The following evaluation was carried out on the obtained test body.

<Distortion Property Evaluation>

The test body surface was observed by eye inspection and evaluated. The evaluation is as shown below. The evaluation results are shown in Table 6 and Table 8.

◯: No distortion was present on the test body surface.

X: The test body surface was distorted.

<Design Property Evaluation>

The design of the test body surface was observed by eye inspection and evaluated.

The evaluation was carried out in a 10-stage evaluation in which those having an excellent design property with a sense of depth, a sense of richness, and a sense of luxury were evaluated as "10", and those being inferior in the design property were evaluated as "1". The evaluation results are shown in Table 6 and Table 8.

<Adhesion Evaluation>

The prepared test body was immersed into hot water of 50° C. for 48 hours and the change in design was observed. The surface condition was evaluated by eye inspection.

The evaluation was carried out in a 10-stage evaluation in which those maintaining an excellent design property with no abnormality were evaluated as "10", and those in which an abnormality such as peeling-off or swelling of the decorative layer was seen were evaluated as "1". The evaluation results are shown in Table 6 and Table 8.

<Fire-Proof Property Evaluation>

The maximum heat-generation speed was evaluated when a radiation heat of 50 kW/m² was radiated onto the test body surface by using an electric heater (CONE III manufactured by Toyo Seiki Co., Ltd.) in accordance with the ISO 5660-1 cone calorimeter method. The evaluation results are shown in Table 8.

⊙: maximum heat-generation speed is less than 175 kW/m²

◯: maximum heat-generation speed is less than 200 kW/m²

Δ: maximum heat-generation speed is 200 kW/m² or more

X: a heat-generation speed of 200 kW/m² or more is continued for 10 seconds or more As a result of evaluation, a good result was obtained in Experiment Examples I-1 to I-7, Experiment Examples I-9 to I-13, and Experiment Example I-15, whereas a result with inferior adhesion was obtained in Experiment Example I-8, and the test body surface got distorted in Experiment Example I-14. Also, a good result was obtained in Experiment Examples I-16 to I-29 and Experiment Examples I-31 to I-32, whereas a result with inferior adhesion was obtained in Experiment Example I-30. Also, a good result was obtained in Experiment Examples I-33 to I-34.

As a result of evaluation, a good result was obtained in Experiment Examples II-1 to II-7, Experiment Examples II-9 to II-13, and Experiment Examples II-15 to II-18, whereas a result with inferior adhesion was obtained in Experiment Example II-8, and the test body surface got distorted in Experiment Example II-14. Also, a good result was obtained in Experiment Examples II-19 to II-32 and Experiment Examples II-34 to II-35, whereas a result with inferior adhesion was obtained in Experiment Example II-33. Also, a good result was obtained in Experiment Examples II-36 to II-40.

TABLE 1

| | |
|---|---|
| Thermosetting resin A | Aqueous acrylic-silicon resin (solid component of 50%, containing alkoxysilyl group and carboxyl group), aqueous epoxy resin (solid component of 50%, containing epoxy group), silicon compound (containing alkoxysilyl group and amino group), mixing ratio (weight ratio); aqueous acrylic-silicon resin:aqueous epoxy resin:silicon compound = 60:35:5 |
| Thermosetting resin B | Aqueous acrylic-silicon resin (solid component of 50%, containing alkoxysilyl group and carboxyl group) |
| Thermosetting resin C | Aqueous epoxy resin (solid component of 50%, containing epoxy group), amine compound (containing amino group), mixing ratio (weight ratio); aqueous epoxy resin:amine compound = 70:30 |
| Thermosetting resin D | Isocyanate compound (containing isocyanate group), polyol (containing hydroxyl group), mixing ratio (weight ratio); isocyanate compound:polyol = 60:40 |
| Thermoplastic resin | Aqueous acrylic resin (solid component of 50%, optical transmittance: 93.2%, containing carboxyl group) |

TABLE 2

| | |
|---|---|
| Coloring material A | Glittering scale-like aggregate; one in which a mica flake surface is coated with a mica pigment coated with titanium oxide (shape (scale-like), size (1.5 mm), thickness (40 μm), hue (blue)) mica flake; shape (scale-like), size (1.5 mm), thickness (40 μm) mica pigment coated with titanium oxide; shape (scale-like), size (5 μm), thickness (500 nm) constitution ratio; mica flake:mica pigment coated with titanium oxide = 100 parts by weight:4 parts by weight |
| Coloring material B | Glittering scale-like aggregate; one in which a mica flake surface is coated with an aluminum flake (shape (scale-like), size (1.5 mm), thickness (40 μm), hue (blue)) mica flake; shape (scale-like), size (1.5 mm), thickness (40 μm) aluminum flake; shape (scale-like), size (100 μm), thickness (12 μm) constitution ratio; mica flake:aluminum flake = 100 parts by weight:4 parts by weight |
| Coloring material C | Glittering scale-like aggregate; one in which a mica flake surface is coated with a mica pigment coated with titanium oxide (shape (scale-like), size (3.0 mm), thickness (40 μm), hue (blue)) mica flake; shape (scale-like), size (3.0 mm), thickness (40 μm) mica pigment coated with titanium oxide; shape (scale-like), size (5 μm), thickness (500 nm) constitution ratio; mica flake:mica pigment coated with titanium oxide = 100 parts by weight:4 parts by weight |

TABLE 2-continued

| | |
|---|---|
| Coloring material D | Glittering scale-like aggregate; one in which a mica flake surface is coated with a mica pigment coated with titanium oxide (shape (scale-like), size (0.5 mm), thickness (30 μm), hue (blue)) mica flake; shape (scale-like), size (0.5 mm), thickness (30 μm) mica pigment coated with titanium oxide; shape (scale-like), size (5 μm), thickness (500 nm) constitution ratio; mica flake:mica pigment coated with titanium oxide = 100 parts by weight:2 parts by weight |
| Coloring material E | Glittering scale-like aggregate; one in which a mica flake surface is coated with a mica pigment coated with titanium oxide (shape (scale-like), size (10.0 mm), thickness (40 μm), hue (blue)) mica flake; shape (scale-like), size (10.0 mm), thickness (40 μm) mica pigment coated with titanium oxide; shape (scale-like), size (8 μm), thickness (500 nm) constitution ratio; mica flake:mica pigment coated with titanium oxide = 100 parts by weight:5 parts by weight |
| Coloring material F | Glittering scale-like pigment; vapor-deposited aluminum flake pigment (shape (scale-like), size (150 μm), thickness (10 μm), hue (blue)) |
| Coloring material G | Glittering scale-like pigment; glittering mica pigment (shape (scale-like), size (35 μm), thickness (10 μm), hue (blue)) |
| Coloring material H | Glittering scale-like pigment; aluminum flake pigment (shape (scale-like), size (400 μm), thickness (25 μm), hue (blue)) |
| Coloring material I | Colored silica sand: shape (spherical), particle size (0.15 mm), hue (blue) |
| Coloring material J | Scale-like colored aggregate; colored mica (shape (scale-like), size (1.0 mm), thickness (40 μm), hue (black)) |

TABLE 3

| | |
|---|---|
| Coloring material K | Glittering scale-like aggregate; one in which a mica flake surface is coated with an aluminum flake (shape (scale-like), size (1.5 mm), thickness (40 μm), hue (silver)) mica flake; shape (scale-like), size (1.5 mm), thickness (40 μm), aluminum flake; shape (scale-like), size (100 μm), thickness (12 μm) constitution ratio; mica flake:aluminum flake = 100 parts by weight:4 parts by weight |
| Coloring material L | Glittering scale-like pigment; glittering mica pigment (shape (scale-like), size (35 μm), thickness (10 μm), hue (silver)) |
| Coloring material M | Glittering scale-like aggregate; one in which a mica flake surface is coated with an aluminum flake (shape (scale-like), size (1.5 mm), thickness (40 μm), hue (green)) mica flake; shape (scale-like), size (1.5 mm), thickness (40 μm) aluminum flake; shape (scale-like), size (100 μm), thickness (12 μm) constitution ratio; mica flake:aluminum flake = 100 parts by weight:4 parts by weight |
| Coloring material N | Glittering scale-like pigment; glittering mica pigment (shape (scale-like), size (35 μm), thickness (10 μm), hue (green)) |
| Coloring material O | Glittering scale-like aggregate; one in which a mica flake surface is coated with an aluminum flake (shape (scale-like), size (1.5 mm), thickness (40 μm), hue (red)) mica flake; shape (scale-like), size (1.5 mm), thickness (40 μm) aluminum flake; shape (scale-like), size (100 μm), thickness (12 μm) constitution ratio; mica flake:aluminum flake = 100 parts by weight:4 parts by weight |

TABLE 3-continued

| | |
|---|---|
| Coloring material P | Glittering scale-like pigment; glittering mica pigment (shape (scale-like), size (35 μm), thickness (10 μm), hue (red)) |
| Coloring material Q | Glittering scale-like aggregate; one in which a mica flake surface is coated with an aluminum flake (shape (scale-like), size (1.5 mm), thickness (40 μm), hue (gold))<br>mica flake; shape (scale-like), size (1.5 mm), thickness (40 μm)<br>aluminum flake; shape (scale-like), size (100 μm), thickness (12 μm)<br>constitution ratio; mica flake:aluminum flake = 100 parts by weight:4 parts by weight |
| Coloring material R | Glittering scale-like pigment; glittering mica pigment (shape (scale-like), size (35 μm), thickness (10 μm), hue (gold)) |
| Coloring material S | Carbon black; hue (black) |
| Flame retardant 1 | Aluminum hydroxide |
| Flame retardant 2 | Tetrabromobisphenol A |
| Flame retardant 3 | Antimony trioxide |

TABLE 4

| | |
|---|---|
| Glass plate 1 | Transparent glass plate (400 mm × 600 mm × 3 mm), optical transmittance: 90.7% |
| Glass plate 2 | Transparent glass plate (400 mm × 600 mm × 5 mm), optical transmittance: 89.2% |
| Glass plate 3 | Colored transparent glass plate (400 mm × 600 mm × 5 mm), optical transmittance: 50.5%, hue: blue |
| Glass plate 4 | Colored transparent glass plate (400 mm × 600 mm × 5 mm), optical transmittance: 47.1%, hue: black |
| Glass plate 5 | Colored transparent glass plate (400 mm × 600 mm × 5 mm), optical transmittance: 42.3%, hue: red |
| Glass plate 6 | Transparent glass plate (400 mm × 600 mm × 1.9 mm), optical transmittance: 84.9% |
| Fibrous layer 1 | Non-woven cloth made of glass fiber (400 mm × 600 mm × 0.4 mm) |
| Fibrous layer 2 | Non-woven cloth made of polyester (400 mm × 600 mm × 0.4 mm) |
| Fibrous layer 3 | Non-woven cloth made of glass fiber (400 mm × 600 mm × 0.7 mm) |
| Fibrous layer 4 | non-woven cloth made of glass fiber (400 mm × 600 mm × 0.2 mm) |
| Metal plate | Aluminum plate (400 mm × 600 mm × 1 mm) |

TABLE 5

| | Decorative layer | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Thermosetting resin A | | | | | 100 | | | | | | | | 100 | 100 |
| Thermosetting resin B | 100 | 100 | 100 | 100 | | | | | 100 | 100 | 100 | 100 | | |
| Thermosetting resin C | | | | | | 100 | | | | | | | | |
| Thermosetting resin D | | | | | | | 100 | | | | | | | |
| Thermoplastic resin | | | | | | | | 100 | | | | | | |
| Coloring material A | | 10 | 10 | | 10 | 10 | 10 | 10 | | | | 3 | 3 | |
| Coloring material B | | 25 | 25 | 40 | 25 | 25 | 25 | 25 | 40 | | | 1 | 1 | |
| Coloring material C | | 5 | 5 | | 5 | 5 | 5 | 5 | | | | 1 | 1 | |
| Coloring material D | | 5 | 5 | | 5 | 5 | 5 | 5 | | | | 1 | 1 | |
| Coloring material E | | | | 5 | | | | | | | | | | |
| Coloring material F | 0.2 | | 0.2 | | 0.2 | 0.2 | 0.2 | 0.2 | | | | 0.2 | 0.2 | 0.2 |
| Coloring material G | | | | | | | | | 0.2 | | | | | |
| Coloring material H | | | | | | | | | | 0.1 | | | | |
| Coloring material I | | | | | | | | | | | 40 | | | |
| Coloring material J | | | | | | | | | | | | 40 | | |
| Coloring material K | | | | | | | | | | | | | | |
| Coloring material L | | | | | | | | | | | | | | |
| Coloring material M | | | | | | | | | | | | | | |
| Coloring material N | | | | | | | | | | | | | | |
| Coloring material O | | | | | | | | | | | | | | |
| Coloring material P | | | | | | | | | | | | | | |
| Coloring material Q | | | | | | | | | | | | | | |
| Coloring material R | | | | | | | | | | | | | | |

| | Decorative layer | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| Thermosetting resin A | 100 | | | | | | | | | | | 90 | 60 |
| Thermosetting resin B | | 100 | 100 | 100 | 100 | 100 | 100 | 100 | 100 | 80 | 20 | | |
| Thermosetting resin C | | | | | | | | | | | | | |
| Thermosetting resin D | | | | | | | | | | | | | |
| Thermoplastic resin | | | | | | | | | | 20 | 80 | 10 | 40 |
| Coloring material A | 6 | 10 | 3 | | | | | | | 3 | 10 | 3 | 10 |
| Coloring material B | | 20 | 1 | | | | | | | 1 | 25 | 1 | 25 |
| Coloring material C | | 5 | 1 | | | | | | | 1 | 5 | 1 | 5 |

TABLE 5-continued

| | 1 | 2 | 3 | 4 | 5 | 6 | 7 | 8 | 9 |
|---|---|---|---|---|---|---|---|---|---|
| Coloring material D | 5 | 1 | | | | 1 | 5 | 1 | 5 |
| Coloring material E | | | | | | | | | |
| Coloring material F | 0.2 | 0.2 | 0.1 | | | 0.2 | 0.2 | 0.2 | 0.2 |
| Coloring material G | | | | | | | | | |
| Coloring material H | | | | | | | | | |
| Coloring material I | | | | | | | | | |
| Coloring material J | | | | | | | | | |
| Coloring material K | | 5 | | | | | | | |
| Coloring material L | | | 0.1 | | | | | | |
| Coloring material M | | | | 40 | 2 | | | | |
| Coloring material N | | | | | 0.2 | | | | |
| Coloring material O | | | | | | 40 | 2 | | |
| Coloring material P | | | | | | | 0.2 | | |
| Coloring material Q | | | | | | | | 40 | 2 |
| Coloring material R | | | | | | | | | 0.2 |

TABLE 6

| | Experiment Examples | | | | | | | | |
|---|---|---|---|---|---|---|---|---|---|
| | I-1 | I-2 | I-3 | I-4 | I-5 | I-6 | I-7 | I-8 | I-9 |
| Transparent glass plate | glass plate 1 | glass plate 1 | glass plate 1 | glass plate 1 | glass plate 1 | glass plate 1 | glass plate 1 | glass plate 1 | glass plate 1 |
| Decorative layer (first) | decorative layer 1 | decorative layer 2 | decorative layer 3 | decorative layer 4 | decorative layer 5 | decorative layer 6 | decorative layer 7 | decorative layer 8 | decorative layer 9 |
| Fibrous layer | fibrous layer 1 | fibrous layer 1 | fibrous layer 1 | fibrous layer 1 | fibrous layer 1 | fibrous layer 1 | fibrous layer 1 | fibrous layer 1 | fibrous layer 1 |
| Distortion property | ○ | ○ | ○ | ○ | ○ | ○ | ○ | ○ | ○ |
| Design property | 6 | 7 | 8 | 7 | 8 | 8 | 8 | 8 | 8 |
| Adhesion | 8 | 8 | 8 | 8 | 10 | 6 | 6 | 4 | 8 |

| | Experiment Examples | | | | | |
|---|---|---|---|---|---|---|
| | I-10 | I-11 | I-12 | I-13 | I-14 | I-15 |
| Transparent glass plate | glass plate 1 | glass plate 1 | glass plate 1 | glass plate 1 | glass plate 1 | glass plate 2 |
| Decorative layer (first) | decorative layer 10 | decorative layer 11 | decorative layer 12 | decorative layer 13 | decorative layer 3 | decorative layer 3 |
| Fibrous layer | fibrous layer 1 | fibrous layer 1 | fibrous layer 1 | fibrous layer 1 | metal plate | fibrous layer 1 |
| Distortion property | ○ | ○ | ○ | ○ | X | ○ |
| Design property | 6 | 6 | 8 | 8 | — | 8 |
| Adhesion | 8 | 8 | 8 | 10 | — | 8 |

| | Experiment Examples | | | | | | | | |
|---|---|---|---|---|---|---|---|---|---|
| | I-16 | I-17 | I-18 | I-19 | I-20 | I-21 | I-22 | I-23 | I-24 |
| Transparent glass plate | glass plate 1 | glass plate 1 | glass plate 1 | glass plate 1 | glass plate 1 | glass plate 3 | glass plate 4 | glass plate 5 | glass plate 1 |
| Decorative layer (first) | decorative layer 1 | decorative layer 12 | decorative layer 13 | decorative layer 14 | decorative layer 15 | decorative layer 17 | decorative layer 19 | decorative layer 21 | decorative layer 23 |
| (second) | decorative layer 2 | decorative layer 3 | decorative layer 5 | decorative layer 5 | decorative layer 3 | decorative layer 16 | decorative layer 18 | decorative layer 20 | decorative layer 22 |
| Fibrous layer | fibrous layer 1 | fibrous layer 1 | fibrous layer 1 | fibrous layer 1 | fibrous layer 1 | fibrous layer 1 | fibrous layer 1 | fibrous layer 1 | fibrous layer 1 |
| Distortion property | ○ | ○ | ○ | ○ | ○ | ○ | ○ | ○ | ○ |
| Design property | 9 | 10 | 10 | 9 | 10 | 10 | 10 | 10 | 10 |
| Adhesion | 8 | 8 | 10 | 10 | 10 | 8 | 8 | 8 | 8 |

| | Experiment Examples | | | | | | | |
|---|---|---|---|---|---|---|---|---|
| | I-25 | I-26 | I-27 | I-28 | I-29 | I-30 | I-31 | I-32 |
| Transparent glass plate | glass plate 1 | glass plate 1 | glass plate 1 | glass plate 1 | glass plate 1 | glass plate 1 | glass plate 1 | glass plate 6 |
| Decorative layer (first) | decorative layer 12 | decorative layer 12 | decorative layer 12 | decorative layer 24 | decorative layer 12 | decorative layer 8 | decorative layer 26 | decorative layer 12 |
| (second) | decorative layer 3 | decorative layer 3 | decorative layer 8 | decorative layer 25 | decorative layer 25 | decorative layer 25 | decorative layer 27 | decorative layer 3 |
| Fibrous layer | fibrous layer 2 | fibrous layer 3 | fibrous layer 1 | fibrous layer 1 | fibrous layer 1 | fibrous layer 1 | fibrous layer 1 | fibrous layer 1 |
| Distortion property | ○ | ○ | ○ | ○ | ○ | ○ | ○ | ○ |
| Design property | 10 | 10 | 10 | 10 | 10 | 10 | 10 | 10 |
| Adhesion | 8 | 8 | 8 | 8 | 8 | 4 | 10 | 8 |

TABLE 6-continued

|  | Experiment Examples | |
|---|---|---|
|  | I-33 | I-34 |
| Transparent glass plate | glass plate 1 | glass plate 1 |
| Decorative layer (first) | decorative layer 12 | decorative layer 12 |
| Fibrous layer | fibrous layer 4 | fibrous layer 4 |
| Decorative layer (second) | decorative layer 12 | decorative layer 3 |
| (third) | decorative layer 3 |  |
| Fibrous layer | fibrous layer 1 | fibrous layer 1 |
| Distortion property | ◯ | ◯ |
| Design property | 10 | 10 |
| Adhesion | 8 | 8 |

TABLE 7

| Flame-retardant layer | 1 | 2 | 3 | 4 |
|---|---|---|---|---|
| Thermoplastic resin | 100 | 100 | 100 | 100 |
| Flame retardant 1 | 800 | 280 | 900 | 500 |
| Flame retardant 2 |  | 120 |  |  |
| Flame retardant 3 |  | 40 |  |  |
| Coloring material S | 10 | 10 | 10 | 10 |

All of the numerical values are shown in parts by weight (solid components).

TABLE 8

| | | | | | Experiment Examples | | | | |
|---|---|---|---|---|---|---|---|---|---|
| | II-1 | II-2 | II-3 | II-4 | II-5 | II-6 | II-7 | II-8 | II-9 |
| Transparent glass plate | glass plate 1 | glass plate 1 | glass plate 1 | glass plate 1 | glass plate 1 | glass plate 1 | glass plate 1 | glass plate 1 | glass plate 1 |
| Decorative layer (first) | decorative layer 1 | decorative layer 2 | decorative layer 3 | decorative layer 4 | decorative layer 5 | decorative layer 6 | decorative layer 7 | decorative layer 8 | decorative layer 9 |
| Flame-retardant layer | flame-retardant layer 1 | flame-retardant layer 1 | flame-retardant layer 1 | flame-retardant layer 1 | flame-retardant layer 1 | flame-retardant layer 1 | flame-retardant layer 1 | flame-retardant layer 1 | flame-retardant layer 1 |
| Fire-proof property | ⊙ | ⊙ | ⊙ | ⊙ | ⊙ | ⊙ | ⊙ | Δ | ⊙ |
| Design property | 6 | 7 | 8 | 7 | 8 | 8 | 8 | 8 | 8 |
| Adhesion | 8 | 8 | 8 | 8 | 10 | 6 | 6 | 4 | 8 |

| | | | | | Experiment Examples | | | | |
|---|---|---|---|---|---|---|---|---|---|
| | II-10 | II-11 | II-12 | II-13 | II-14 | II-15 | II-16 | II-17 | II-18 |
| Transparent glass plate | glass plate 1 | glass plate 1 | glass plate 1 | glass plate 1 | glass plate 1 | glass plate 2 | glass plate 1 | glass plate 1 | glass plate 1 |
| Decorative layer (first) | decorative layer 10 | decorative layer 11 | decorative layer 12 | decorative layer 13 | decorative layer 3 | decorative layer 3 | decorative layer 3 | decorative layer 3 | decorative layer 3 |
| Flame-retardant layer | flame-retardant layer 1 | flame-retardant layer 1 | flame-retardant layer 1 | flame-retardant layer 1 | metal plate | flame-retardant layer 1 | flame-retardant layer 2 | flame-retardant layer 3 | flame-retardant layer 4 |
| Decorative layer (second) | | | | | | | | | |
| Fire-proof property | ⊙ | ⊙ | ⊙ | ⊙ | Δ | ⊙ | ○ | ⊙ | ⊙ |
| Design property | 6 | 6 | 8 | 8 | *1 | 8 | 8 | 8 | 8 |
| Adhesion | 8 | 8 | 8 | 10 | 8 | 8 | 8 | 8 | 8 |

| | | | | | Experiment Examples | | | | |
|---|---|---|---|---|---|---|---|---|---|
| | II-19 | II-20 | II-21 | II-22 | II-23 | II-24 | II-25 | II-26 | II-27 |
| Transparent glass plate | glass plate 1 | glass plate 1 | glass plate 1 | glass plate 1 | glass plate 1 | glass plate 3 | glass plate 4 | glass plate 5 | glass plate 1 |
| Decorative layer (first) | decorative layer 1 | decorative layer 12 | decorative layer 13 | decorative layer 14 | decorative layer 15 | decorative layer 17 | decorative layer 19 | decorative layer 21 | decorative layer 23 |
| Flame-retardant layer | flame-retardant layer 1 | flame-retardant layer 1 | flame-retardant layer 1 | flame-retardant layer 1 | flame-retardant layer 1 | flame-retardant layer 1 | flame-retardant layer 1 | flame-retardant layer 1 | flame-retardant layer 1 |
| Decorative layer (second) | decorative layer 2 | decorative layer 3 | decorative layer 5 | decorative layer 5 | decorative layer 3 | decorative layer 16 | decorative layer 18 | decorative layer 20 | decorative layer 22 |
| Fire-proof property | ⊙ | ⊙ | ⊙ | ⊙ | ⊙ | ⊙ | ⊙ | ⊙ | ⊙ |
| Design property | 9 | 10 | 10 | 9 | 10 | 10 | 10 | 10 | 10 |
| Adhesion | 8 | 8 | 10 | 10 | 10 | 8 | 8 | 8 | 8 |

TABLE 8-continued

| | Experiment Examples | | | | | | | |
|---|---|---|---|---|---|---|---|---|
| | II-28 | II-29 | II-30 | II-31 | II-32 | II-33 | II-34 | II-35 |
| Transparent glass plate | glass plate 1 | glass plate 1 | glass plate 1 | glass plate 1 | glass plate 1 | glass plate 1 | glass plate 1 | glass plate 6 |
| Decorative layer (first) | decorative layer 12 | decorative layer 13 | decorative layer 12 | decorative layer 24 | decorative layer 12 | decorative layer 8 | decorative layer 26 | decorative layer 12 |
| Decorative layer (second) | decorative layer 3 | decorative layer 5 | decorative layer 8 | decorative layer 25 | decorative layer 25 | decorative layer 25 | decorative layer 27 | decorative layer 3 |
| Flame-retardant layer | flame-retardant layer 2 | flame-retardant layer 2 | flame-retardant layer 1 | flame-retardant layer 1 | flame-retardant layer 1 | flame-retardant layer 1 | flame-retardant layer 1 | flame-retardant layer 1 |
| Fire proof property | ⊙ | ○ | ⊙ | ⊙ | ⊙ | ⊙ | ⊙ | ⊙ |
| Design property | 10 | 10 | 10 | 10 | 10 | 10 | 10 | 10 |
| Adhesion | 8 | 10 | 8 | 8 | 8 | 4 | 10 | 8 |

| | Experiment Examples | | | | |
|---|---|---|---|---|---|
| | II-36 | II-37 | II-38 | II-39 | II-40 |
| Transparent glass plate | glass plate 1 | glass plate 1 | glass plate 1 | glass plate 1 | glass plate 1 |
| Decorative layer (first) | decorative layer 12 | decorative layer 3 | decorative layer 13 | decorative layer 14 | decorative layer 12 |
| Decorative layer (second) | | | decorative layer 5 | decorative layer 5 | decorative layer 3 |
| Flame-retardant layer | flame-retardant layer 1 | flame-retardant layer 1 | flame-retardant layer 1 | flame-retardant layer 1 | flame-retardant layer 1 |
| Fibrous layer | fibrous layer 1 | fibrous layer 1 | fibrous layer 1 | fibrous layer 1 | fibrous layer 1 |
| Fire-proof property | ⊙ | ⊙ | ⊙ | ⊙ | ⊙ |
| Design property | 10 | 8 | 10 | 10 | 10 |
| Adhesion | 8 | 8 | 10 | 10 | 8 |
| Distortion property | ○ | ○ | ○ | ○ | ○ |

*1 The test body got distorted, and an excellent design property was not obtained.

What is claimed is:

1. An architectural material having a transparent glass plate on the outermost surface thereof in which a decorative layer is laminated on the back side of the transparent glass plate, wherein
   the decorative layer is a decorative layer containing a bonding material and a coloring material and is made of one layer or two or more layers, said coloring material comprising at least two kinds of particles in different sizes, wherein a first kind of particle has a size of 0.1 µm or more and less than 0.5 mm and a second kind of particle has a size of 0.5 mm or more and 10 mm or less;
   the bonding material of the decorative layer that is in contact with the transparent glass plate contains at least a thermosetting resin; and
   a fibrous layer or a flame-retardant layer laminated on the back side of the decorative layer.

2. The architectural material according to claim 1, wherein the fibrous layer is selected from the group consisting of a woven cloth, a non-woven cloth, and a mesh.

3. The architectural material according to claim 2, wherein a flame-retardant contained in the flame-retardant layer selected from the group consisting of a phosphorus compound, a halide, an antimony compound, a boric acid compound, and a hydrated metal compound.

4. The architectural material according to claim 1, wherein a flame-retardant contained in the flame-retardant layer is selected from the group consisting of a phosphorus compound, a halide, an antimony compound, a boric acid compound, and a hydrated metal compound.

5. The architectural surface according to claim 1, wherein the first kind of particle has a size of 0.5 µm to 0.3 mm.

6. The architectural surface according to claim 1, wherein the second kind of particle has a size of 0.7 mm to 5 mm.

7. The architectural surface according to claim 1, wherein the first kind of particles is disposed closer to the surface than the second kind of particles.

8. An architectural material comprising:
   a transparent glass plate on an outermost surface of the laminate,
   at least one decorative layer containing a bonding material and coloring material, wherein the bonding material in contact with the transparent glass contains at least a thermosetting resin and said coloring material comprising at least two kinds of particles in different sizes, wherein a first kind of particle has a size of 0.1 µm or more and less than 0.5 mm and a second kind of particle has a size of 0.5 mm or more and 10 mm or less, and
   a fibrous layer or a flame-retardant layer in contact with the decorative layer.

9. The architectural material according to claim 8, wherein the fibrous layer is selected from the group consisting of a woven cloth, a non-woven cloth, and a mesh.

10. The architectural surface according to claim 9, wherein a flame-retardant contained in the flame-retardant layer is selected from the group consisting of a phosphorus compound, a halide, an antimony compound, a boric acid compound, and a hydrated metal compound.

11. The architectural surface according to claim 8, wherein a flame-retardant contained in the flame-retardant layer is selected from the group consisting of a phosphorus compound, a halide, an antimony compound, a boric acid compound, and a hydrated metal compound.

12. The architectural surface according to claim 8, wherein the first kind of particle has a size of 0.5 µm to 0.3 mm.

13. The architectural surface according to claim 8, wherein the second kind of particle has a size of 0.7 mm to 5 mm.

14. The architectural surface according to claim 8, wherein the first kind of particles is disposed closer to the surface than the second kind of particles.

* * * * *